(12) United States Patent
Griffel

(10) Patent No.: US 6,264,345 B1
(45) Date of Patent: Jul. 24, 2001

(54) DRIP PREVENTING CANDLE HOLDER WITH DECORATIVE FOLLOWER PROVIDING AUXILIARY ILLUMINATION

(75) Inventor: Giora Griffel, Bergenfield, NJ (US)

(73) Assignee: The Candle Machine Co, Tenafly, NJ (US)

(*) Notice: Subject to any disclaimer, the term of this patent is extended or adjusted under 35 U.S.C. 154(b) by 0 days.

(21) Appl. No.: 09/217,920

(22) Filed: Dec. 21, 1998

Related U.S. Application Data

(63) Continuation-in-part of application No. 09/095,997, filed on Jun. 11, 1998, now Pat. No. 5,879,152.

(51) Int. Cl.[7] .............................. F21L 19/00; F21V 35/00
(52) U.S. Cl. .......................... 362/161; 362/84; 362/166; 362/172; 362/173
(58) Field of Search .................................. 362/161, 163, 362/166, 171–173, 178, 84, 260

(56) References Cited

U.S. PATENT DOCUMENTS

| | | | |
|---|---|---|---|
| 84,103 | 11/1868 | Foote . | |
| 280,101 | * 6/1883 | Waldron | 362/161 |
| D. 288,722 | 3/1987 | Uarada | D26/11 |
| 307,952 | 11/1884 | Chinnock . | |
| 1,200,121 | 10/1916 | Knapp . | |
| 1,255,614 | * 2/1918 | Knapp | 362/163 |
| 1,350,461 | 8/1920 | Knapp | 431/293 |
| 1,365,485 | 1/1921 | Guest . | |
| 1,671,652 | 5/1928 | ONeill | 431/293 |
| 2,056,605 | * 10/1936 | Guilfoil | 362/161 |
| 2,082,897 | * 8/1937 | Muench et al. | 362/163 |
| 2,349,072 | 5/1944 | Bormann | 431/293 |
| 3,767,910 | 10/1973 | Harrigan | 362/569 |
| 4,544,351 | 10/1985 | Marsicano | 431/11 |
| 4,566,055 | 1/1986 | Klees | 362/162 |
| 4,755,135 | 7/1988 | Kwok | 431/291 |
| 5,057,005 | 10/1991 | Kwok | 431/253 |
| 5,193,994 | 3/1993 | Schirneker | 431/293 |
| 5,228,771 | * 7/1993 | Zimmerman | 362/163 |

FOREIGN PATENT DOCUMENTS

| | | |
|---|---|---|
| 3001359 | 7/1981 | (DE) . |
| 779643 | 1/1935 | (FR) . |
| 1280056 | 11/1961 | (FR) . |
| 21125 | of 1894 | (GB) . |
| 134475 | 11/1919 | (GB) . |
| 230229 | 3/1925 | (GB) . |
| 2067739 | 7/1981 | (GB) . |
| 471248 | 5/1952 | (IT) . |
| 9-16517 | 6/1997 | (JP) . |

* cited by examiner

Primary Examiner—Alan Cariaso
(74) Attorney, Agent, or Firm—Robert W. J. Usher

(57) ABSTRACT

A one-piece, drip preventing follower of transparent glass has an annular shoulder sitting on an upper shoulder of the candle formed with a central, wick receiving opening with a lip from which extends an outwardly and upwardly flaring portion providing a melted wax receiving bowl. A skirt depends from the annular shoulder spaced from and longer than the candle body for telescopically receiving a candlestick providing guided descent of the follower. The annular lip has an upwardly inclined, flat or convex, annular optical face providing an optical aperture aligned to receive, light refracted through the melted wax from the candle flame for transmission by total internal reflection down the entire length of the skirt, the lower end of which is coated with a suitably fluorescent material, providing a pleasing bright ring of light, both decorative and an additional source of illumination.

16 Claims, 5 Drawing Sheets

DRIP PREVENTING CANDLE HOLDER WITH DECORATIVE FOLLOWER PROVIDING AUXILIARY ILLUMINATION

RELATED APPLICATION

This is a continuation-in-part application of Ser. No 09/095,997, filed Jun. 11, 1998 now U.S. Pat. No. 5,809,152.

FIELD OF THE INVENTION

The invention relates to a drip preventing candle holder which provides auxiliary illumination at a location remote from the candle flame.

BACKGROUND OF THE INVENTION

The problems associated with dripping candles, complete burning and effective candle mounting are well recognized and there have been numerous attempts, over more than one hundred years, to provide both practical and aesthetically attractive solutions while maximizing effective illumination.

One type of a drip preventing candle holder is taught by U.S. Pat. No. 1,365,485 issued in 1921 to Guest and comprises a drip preventing and candle stabilizing cap member or follower having an annular shoulder portion for sitting on a shoulder of the candle to descend under gravity during consumption thereof and a central, wick receiving opening with a lip to contain melted wax and a cylindrical skirt depending from the annular portion; a stand having a base and an upstanding, socket-less candlestick with a candle supporting surface and receivable in sealing engagement within the cap during the last stages of consumption of the candle to reduce or prevent leakage of melted wax; and complementary cap guiding means on the cap member and base.

In the Guest patent, the candlestick is of constant width, substantially equal to the width of the candle and supporting surface and, preferably, the guiding means includes a cylindrical sleeve member upstanding from the base of the stand surrounding the candlestick in coaxial relation to provide therebetween a skirt receiving socket. The skirt is of greater axial length than the candle and is guided by sliding receipt in the socket during burning, ensuring even, vertical descent of the cap member. Furthermore, the lip is extended to provide a large bowl as necessary to contain the increased amount of wax melted as a result of the high thermal conductivity of the cap which is apparently metal.

However, that construction is relatively bulky and heavy, also requiring vent holes in the walls of the cap for cooling the candle body and another set of holes at the edge of the socket extending into the bowl to drain back reliquified wax from the bowl at the final stage of burning adding to complexity and manufacturing cost. Removal of any wax leaking into the socket can be relatively time consuming and difficult.

In addition, as with another proposal taught by G.B patent 230,229 granted 1925 to Riley, in which a follower's skirt telescopically receives the candlestick, the candle body is concealed from view substantially completely throughout burning as the follower is made of metal.

An additional problem often encountered in candle-lit restaurants, particularly when a diner's eye level is higher than the flame of a candle upstanding from the table top is difficulty in reading a menu on the table below the candle as a result of the relative brightness of the candle flame. Auxiliary illumination below the candle is therefore desirable.

U.S. Pat. No. 3,767,910 teaches a cap or follower carrying a chimney, both transparent glass, with a radial array of optical fibers positioned on the chimney with one of their respective ends aligned with the candle flame so that a ring of discrete, minute points of light is emitted by their other ends. However, while decorative, such arrangement is relatively complex and the light ring is at the same general height as the candle flame and does not significantly increase the level of illumination spaced below the candle flame.

Other prior candle holders with cap members or followers, some of which are made of transparent glass are taught by U.S. Pat. Nos. 84,103; 1,225,614; 1,350,461; 1,671,652; 2,503,236; 3,071,952; 4,544,357; 4,566,055; 4,755,135; 5,057,005; U.S. design Pat. No. 288,722; U.K. patent application publication 2,067,739 and Japanese patent application publication 9161517.

SUMMARY OF THE INVENTION

It is an object of the invention to provide a socketless, drip preventing candle holder or device which operates effectively to ensure leak free consumption while permitting use of a generic candle.

Another object of the invention is to provide a candle holder or device which permits the entire candle body and flame to be seen throughout burning.

An additional object of the invention is to decorate a standard candle by utilizing a follower with a transparent skirt extending over the entire candle.

A further object of the invention is to provide a candle holder or device which provides enhanced illumination of an area below the candle flame A still further object of the invention is to provide a candle holder or device that can be easily cleaned.

An additional object of the invention is to provide a candle holder which is of relatively simple construction suitable for economic production by conventional mass production techniques.

Accordingly, the invention provides a drip preventing device for a candle of a type comprising a candle follower having an annular shoulder portion for sitting on a shoulder of the candle to descend under gravity during consumption thereof and a central, wick receiving opening with an annular lip to contain melted wax and a cylindrical skirt depending from the annular shoulder portion for receiving a candle body; wherein the candle follower is made in one piece of transparent material with a melted wax containing bowl extending outwardly and upwardly from the annular lip which has an upwardly inclined, annular optical face providing an optical aperture aligned to receive, normally, light refracted through the melted wax from the candle flame for transmission by total internal reflection down the entire length of the skirt for emission from a lower end thereof.

In one embodiment, the optical face is flat providing an optical aperture aligned to receive, light incident normally thereon while, in another embodiment, the optical face is convex, the bulbous form increasing the amount of light collected.

The lower end of the skirt may, for example, be coated with a fluorescent material excited by the candle light, particularly by infrared light.

The wall of the skirt may be decorated by transparent inks or dies, stickers, fluorescent material, opaque color layers with transparent openings.

The device further comprises a stand having a base and an upstanding, socket-less candlestick with a recessed candle supporting surface at least as wide as the candle and the skirt is elongate for containing an entire candle and so that the candlestick is receivable in sliding engagement within the skirt, providing precise vertical descent of the cap member or follower throughout the entire burning of the candle and for sealing engagement within the cap member during a final stage of consumption to prevent leakage of melted wax.

This construction will provide sufficient lateral support and guidance for the cap throughout descent to enable both the essentially socketless structure to be maintained with total, drip-free consumption of a universally available, generic candle type with some thickness variation accommodated.

Substantially the entire candle is exposed to view throughout burning maintaining the desired natural and symbolic quality of the living flame which is the primary reason for candle use in homes and restaurants.

BRIEF DESCRIPTION OF THE DRAWINGS

Specific embodiments of the invention will now be described by way of example only with reference to the accompanying drawings in which.

DESCRIPTION OF PARTICULAR EMBODIMENTS

Figure 1A:
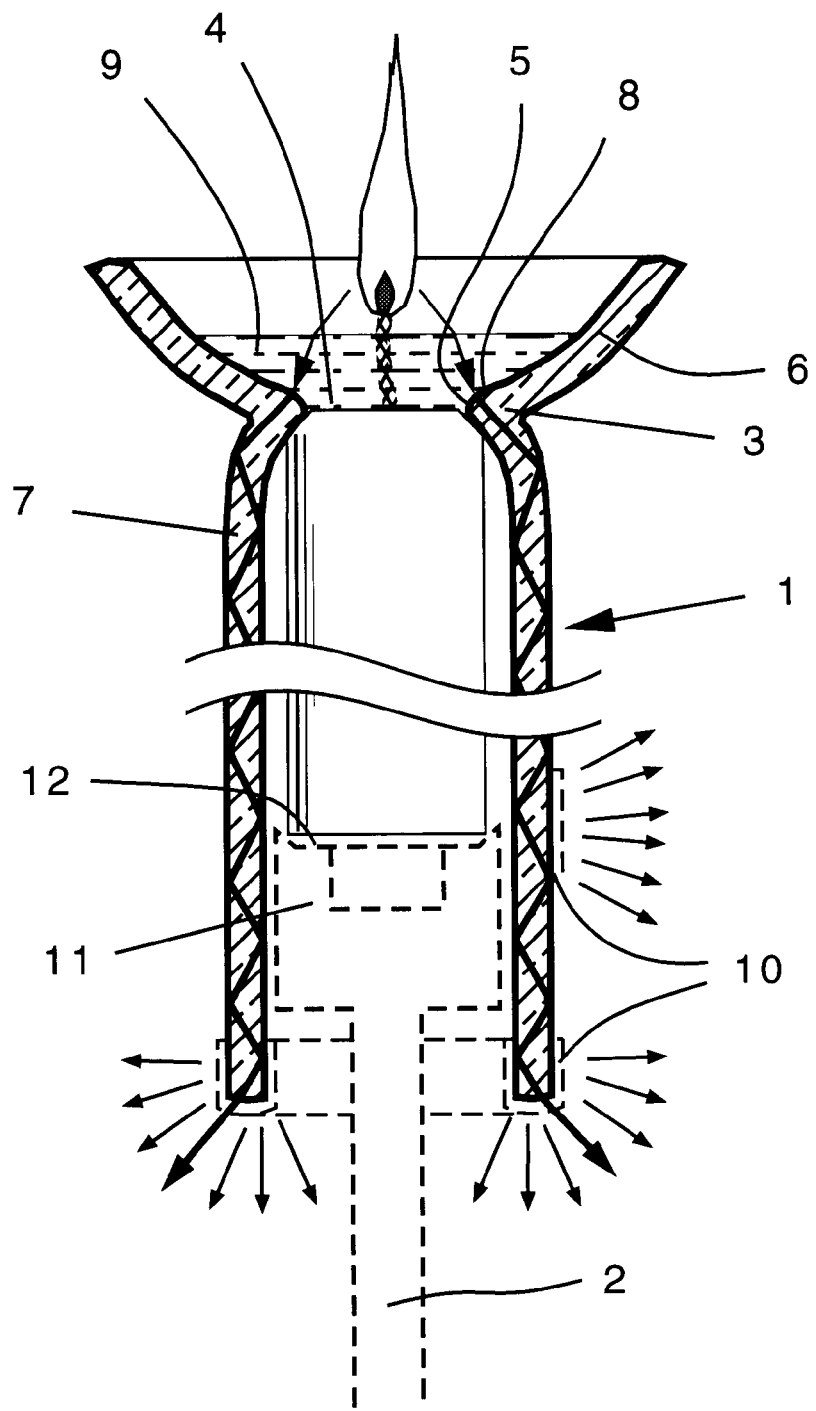
FIG. 1a is a schematic cross-sectional view of a first embodiment of socketless drip preventing candle holder with the candle partly consumed.
Figure 1:
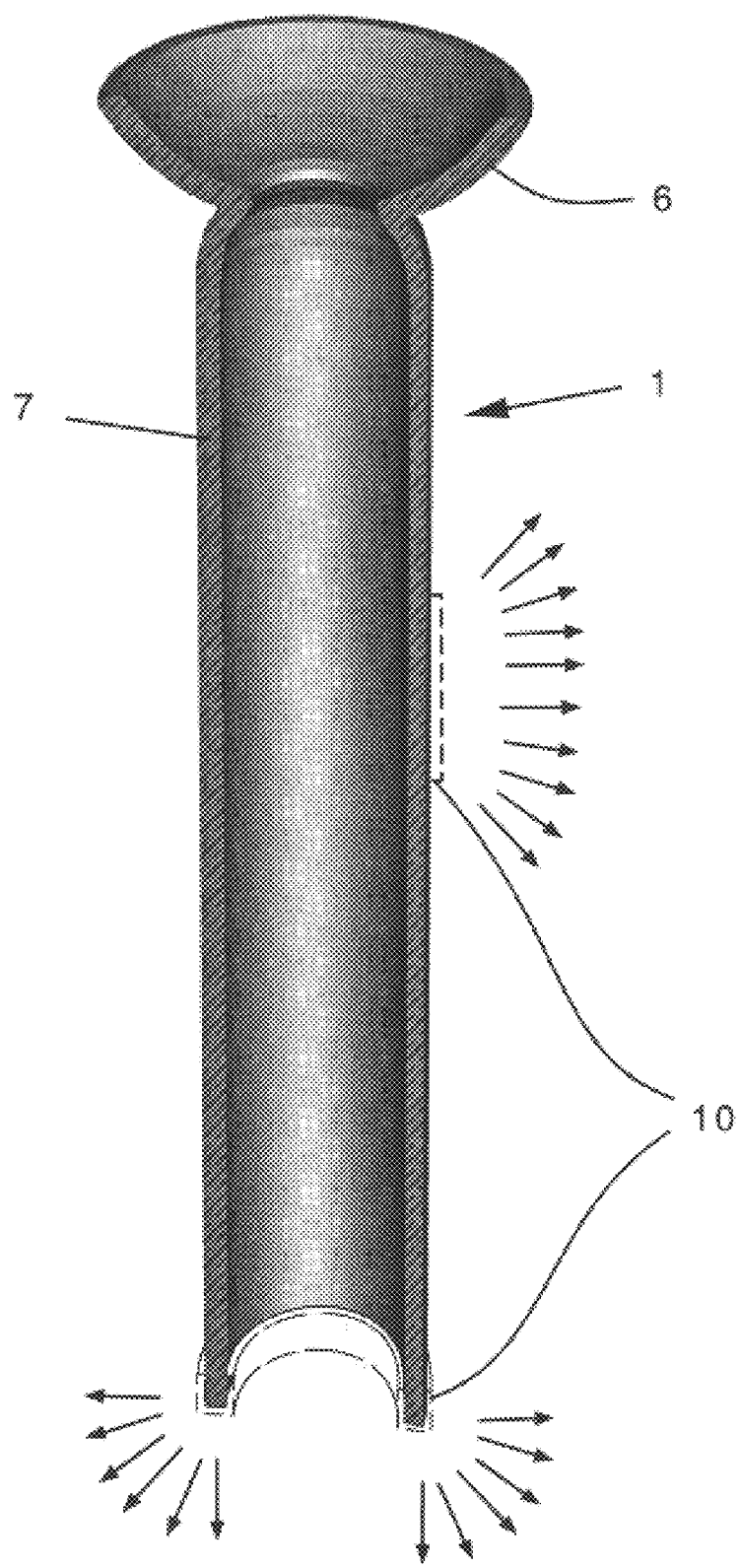
FIG. 1b is perspective view, partly cut away, of the first embodiment.

The first embodiment of the invention, shown in FIGS 1a and 1b, comprises a drip preventing and candle stabilizing cap member or follower 1 and candlestick 2.

The cap member 1 is made in one piece of heat resistant, transparent glass and has an annular shoulder or constriction 3 for sitting on an upper shoulder of the candle formed with a central, wick receiving opening 4 with a lip 5 from which a melted wax containing bowl 6 extends outwardly and upwardly. A skirt 7 depends from the annular shoulder 3, spaced apart from and longer than the candle body.

The annular lip 5 has an upwardly inclined, flat, annular optical face 8 providing an optical aperture aligned to receive, normally, light refracted through the melted wax 9 from the candle flame for transmission by total internal reflection down the entire length of the skirt, the lower end and wall portion of which is coated with a fluorescent material shown schematically at 10, which is excitable by the light emitted by the candle flame, providing a pleasing bright ring of light, which is both decorative and an additional source of illumination. In an alternative embodiment, the lower end of the skirt, or a surface of a wall portion, is roughened to scatter light transmitted along the skirt wall.

The stand 2 has a base (not shown) and an upstanding socket-less candlestick 11 with a shallow concave candle supporting surface 12 at least as wide as the candle.

This is a simple and inexpensive construction which ensures reliable candle mounting with total, drip-free consumption of a generic type of candle, while the candle remains visible through the glass cap member throughout burning.

Figure 2:
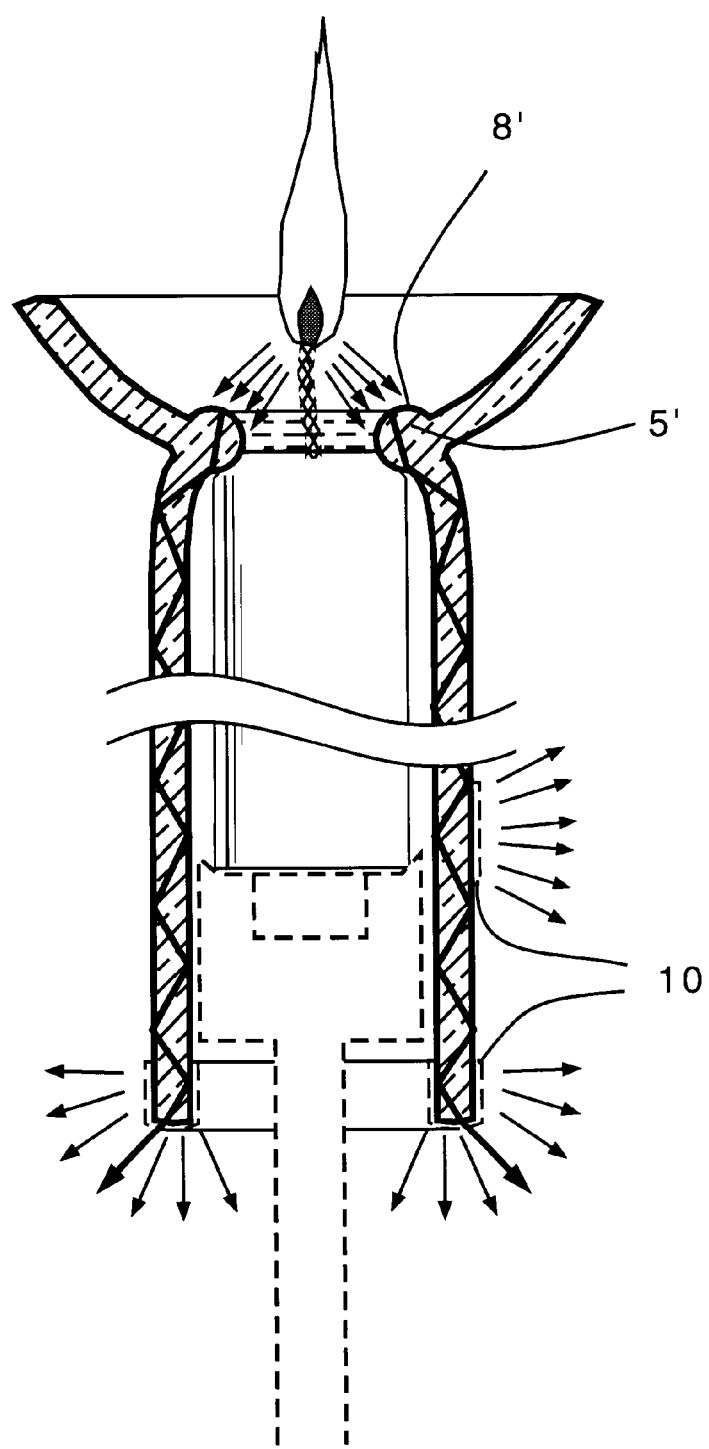
FIG. 2a is a schematic cross-sectional view of a second embodiment.
FIG. 2b is perspective view, partly cut away, of the second embodiment.
Figure 2:
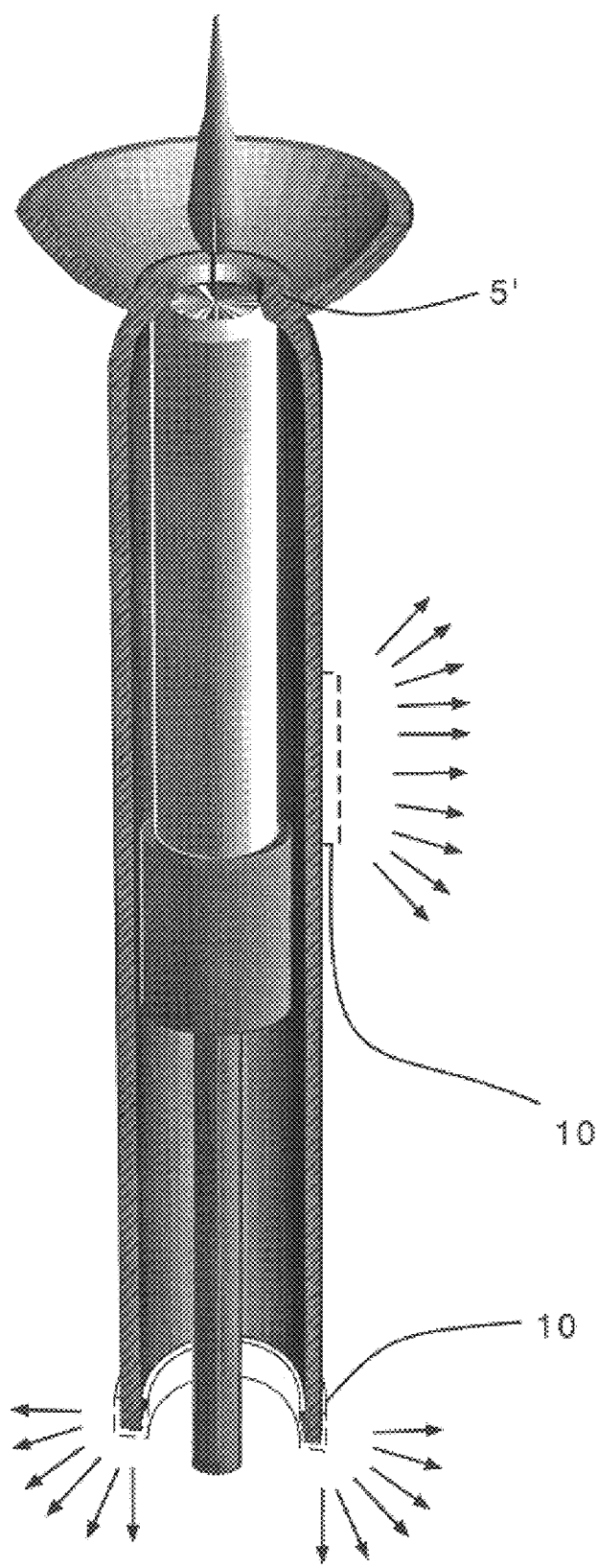

In the second embodiment, shown in FIGS. 2a and 2b, the annular lip 5' is convexly curved providing an optical aperture in the form of a convex lens structure 8' to increase the amount of light collected for transmission by total internal reflection to the lower end of the skirt. A portion of the convex lens structure protrudes above the molten wax so as to be exposed to receive direct light from the candle flame.

Figure 3:
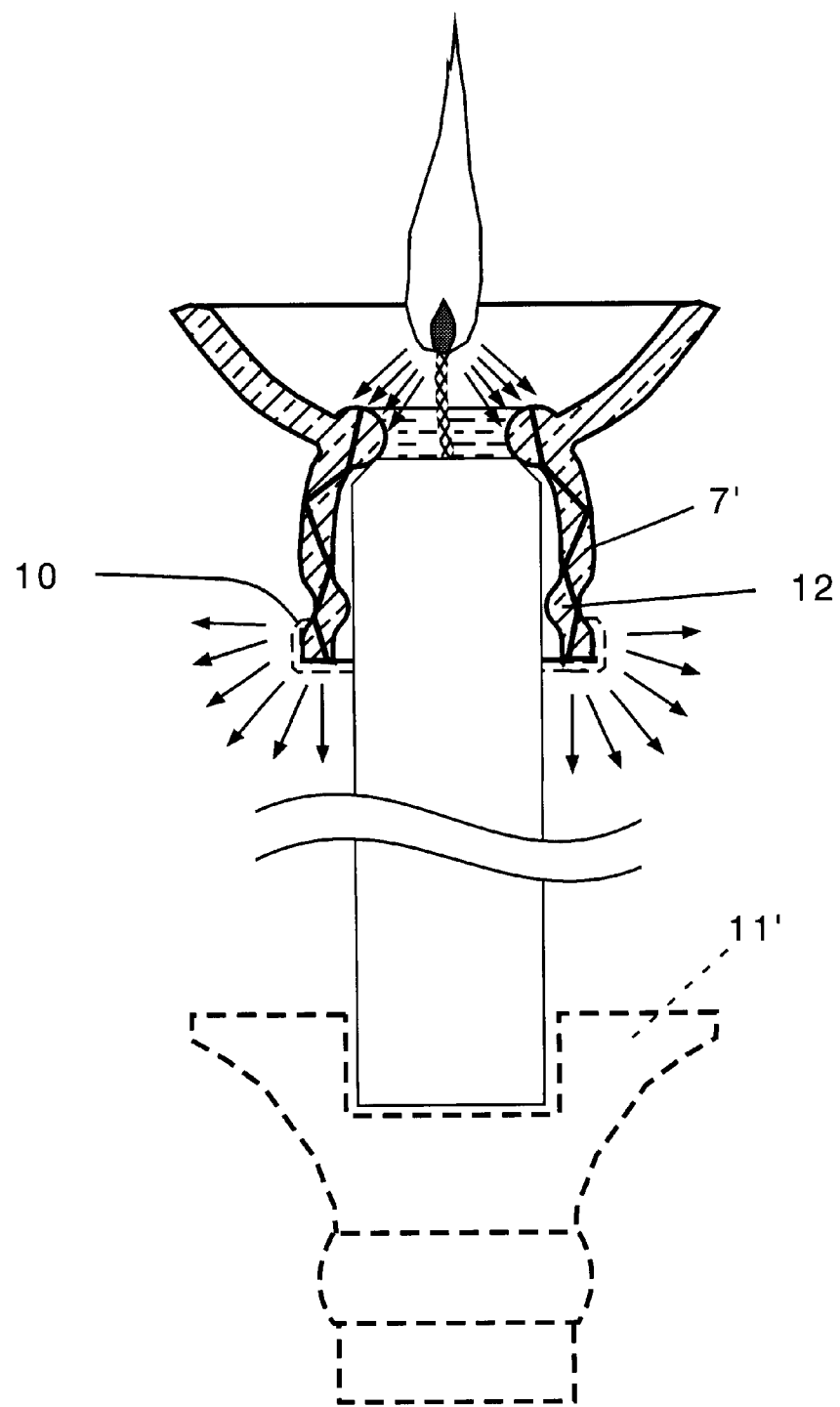
FIG. 3 is a schematic cross-sectional view of a third embodiment of socketless drip preventing candle holder with the candle partly consumed.

In the third embodiment shown in FIG. 3, the cap member or follower is of similar construction to that of the second embodiment except that the skirt 7' is shorter so that it does not receive the candlestick 11'. A ring of individual, radially inwardly extending, candle engaging, protruberences 12 are formed around the skirt adjacent a lower end thereof to obviate tilting throughout descent, which otherwise could prevent descent of the candle follower.

The disclosure of parent application Ser. No. 09/095,997, filed Jun. 11, 1998, is incorporated herein by reference.

For the purpose of any divisional design patent application, the candle, candlestick, melted wax and illustrated luminescent material are solely environmental and do not form part of the design.

What is claimed is:

1. A drip preventing device for a candle of a type comprising a candle follower having an annular shoulder portion for sitting on a shoulder of the candle to descend under gravity during consumption thereof, the annular shoulder portion having a central, wick receiving opening with an annular lip to contain melted wax and an cylindrical skirt depending from the annular shoulder portion for receiving a candle body;

wherein the candle follower is one piece of transparent material and is formed with a melted wax containing bowl extending outwardly and upwardly from the annular lip which has an upwardly inclined, annular optical face providing an optical aperture aligned to receive, normally, light refracted through the melted wax from the candle flame for transmission by total internal reflection down the entire length of the skirt for emission from a lower end thereof, at least one of the lower end of the skirt and a surface of a wall portion of the skirt, being treated to scatter light transmitted down the skirt.

2. A drip preventing device according to claim 1, wherein the optical face is flat providing an optical aperture aligned to receive, light incident normally thereon.

3. A drip preventing device according to claim 1, wherein the optical face is convex.

4. A drip preventing device according to claim 1, wherein said at least one of the lower end of the skirt and a surface of a wall portion of the skirt, is treated by coating with a candle light scattering material.

5. A drip preventing device according to claim 1, wherein said at least one of the lower end of the skirt and a surface of a wall portion of the skirt, is treated by coating with a fluorescent material excited by the candle light.

6. A drip preventing device according to claim 1, wherein said at least one of the lower end of the skirt and a surface of a wall portion of the skirt, is treated by roughening.

7. A drip preventing device according to claim 1, wherein said surface of a wall portion of the skirt is is treated to form one of a pattern or logo.

8. A drip preventing device according to claim 1, further comprising a stand having a base and an upstanding, socketless candlestick with a recessed candle supporting surface, the skirt being elongate for containing an entire candle and so that the candlestick is receivable in sliding engagement within the skirt, guiding descent of the candle follower throughout the entire burning of the candle and for sealing engagement within the candle follower during a final stage of consumption to prevent leakage of melted wax.

9. A drip preventing device according to claim 2, further comprising a stand having a base and an upstanding, socket-less candlestick with a recessed candle supporting surface and the skirt being elongate for containing an entire candle and so that the candlestick is receivable in sliding engagement within the skirt, guiding descent of the candle follower throughout the entire burning of the candle and for sealing engagement within the candle follower during a final stage of consumption to prevent leakage of melted wax.

10. A drip preventing device according to claim 3, further comprising a stand having a base and an upstanding, socket-less candlestick with a recessed candle supporting surface and the skirt being elongate for containing an entire candle and so that the candlestick is receivable in sliding engagement within the skirt, guiding descent of the candle follower throughout the entire burning of the candle and for sealing engagement within the candle follower during a final stage of consumption to prevent leakage of melted wax.

11. A drip preventing device according to claim 4, further comprising a stand having a base and an upstanding, socket-less candlestick with a recessed candle supporting surface and the skirt being elongate for containing an entire candle and so that the candlestick is receivable in sliding engagement within the skirt, guiding descent of the candle follower throughout the entire burning of the candle and for sealing engagement within the candle follower during a final stage of consumption to prevent leakage of melted wax.

12. A drip preventing device for a candle of a type comprising a candle follower having an annular shoulder portion for sitting on a shoulder of the candle to descend under gravity during consumption thereof, the annular shoulder portion having a central, wick receiving opening with an annular lip to contain melted wax and an cylindrical skirt depending from the annular shoulder portion for receiving a candle body;

and a stand having a base and an upstanding, socket-less candlestick with a recessed candle supporting surface at least as wide as a width of candle thereon;

the skirt being elongate for containing an entire candle and so that the candlestick is receivable in sliding engagement within the skirt, ensuring vertically guided descent of the candle follower throughout the entire burning of the candle;

wherein the candle follower is one piece of transparent material and is formed with a melted wax containing bowl extending outwardly and upwardly from the annular lip.

13. A drip preventing device according to claim 3, wherein at least a portion of the convex optical face remains exposed above melted wax throughout candle burning.

14. A drip preventing device according to claim 5, further comprising a stand having a base and an upstanding, socket-less candlestick with a recessed candle supporting surface, the skirt being elongate for containing an entire candle and so that the candlestick is receivable in sliding engagement within the skirt, guiding descent of the candle follower throughout the entire burning of the candle.

15. A drip preventing device according to claim 6, further comprising a stand having a base and an upstanding, socket-less candlestick with a recessed candle supporting surface, the skirt being elongate for containing an entire candle and so that the candlestick is receivable in sliding engagement within the skirt, guiding descent of the candle follower throughout the entire burning of the candle.

16. A drip preventing device according to claim 7, further comprising a stand having a base and an upstanding, socket-less candlestick with a recessed candle supporting surface, the skirt being elongate for containing an entire candle and so that the candlestick is receivable in sliding engagement within the skirt, guiding descent of the candle follower throughout the entire burning of the candle.

* * * * *